US005106719A

United States Patent [19]

[11] Patent Number: 5,106,719

[45] Date of Patent: Apr. 21, 1992

Oshikoshi et al.

[54] METHOD OF MAKING BOOKLETS WITH PHOTOGRAPHS AND APPARATUS THEREFOR

[75] Inventors: Yuji Oshikoshi; Yoshimi Suganuma, both of Tokyo; Hiroshi Hara, Kanagawa; Kazuo Shiota, Kanagawa; Nobumitsu Takehara, Kanagawa; Kiichiro Sakamoto, Kanagawa, all of Japan

[73] Assignee: Fuji Photo Film Co., Ltd., Kanagawa, Japan

[21] Appl. No.: 261,299

[22] Filed: Oct. 24, 1988

[30] Foreign Application Priority Data

| | | | |
|---|---|---|---|
| Oct. 23, 1987 | [JP] | Japan | 62-267847 |
| Oct. 23, 1987 | [JP] | Japan | 62-267848 |
| Oct. 26, 1987 | [JP] | Japan | 62-269935 |

[51] Int. Cl.[5] .......................... G03C 5/54; G03C 3/00; G09C 3/00

[52] U.S. Cl. ...................................... 430/203; 430/11; 430/207; 430/237; 430/12; 430/10; 283/77; 283/904

[58] Field of Search ........................ 283/74, 75, 77, 82, 283/9, 904, 83; 412/19, 1, 902; 430/10, 12, 203, 237, 11, 207; 355/109; 156/87, 289

[56] References Cited

U.S. PATENT DOCUMENTS

| | | | |
|---|---|---|---|
| 4,288,533 | 9/1981 | Poskhus | 430/207 |
| 4,425,421 | 1/1984 | Rutges et al. | 430/237 |

*Primary Examiner*—Richard L. Schilling

*Attorney, Agent, or Firm*—Sughrue, Mion, Zinn, Macpeak & Seas

[57] ABSTRACT

A system for providing a personal booklet, such as a passport, with a picture of the face and personal data of the bookholder to thereby provide the booklet holder's identity. The system includes entering a picture of the face of an applicant, the picture being attached to an application form, as a figure image into an image composing device, entering personal data of the applicant entered in the application form as a character image, providing a composite image of the figure and character images, printing the composite image onto a thermal transfer type photosensitive printing paper, transfering the printed composite image onto an image receiving layer coated on a transparent cover sheet bound in the booklet, and sandwiching the image receiving material layer between a supporting sheet bound in the booklet next to the transparent cover sheet and the transparent cover sheet.

8 Claims, 10 Drawing Sheets

METHOD OF MAKING BOOKLETS WITH PHOTOGRAPHS AND APPARATUS THEREFOR

BACKGROUND OF THE INVENTION

The present invention relates to a method and an apparatus for making personal booklets with photographs, and more particularly, to a method and apparatus for making personal booklets having a page with a composite image comprising a picture of a human figure and personal data relating to the human figure.

FIELD OF THE INVENTION

Personal booklets such as passports have a picture of the face of the bookholder attached to one the pages thereof as well as personal data of the bookholder including the name, nationality, date of birth sex, date of issue, a personal identification number and so forth to provide the book holder's identity. This picture is covered by a transparent cover sheet and embossed with a seal in order to prevent the passport from being forged or altered by replacing the picture.

The passports are made through a process of several steps including at least a step of entering the necessary personal data, a step of attaching a picture of the face of the applicant and a step of covering the attached picture with a transparent cover sheet. Such a process requires much labor and is inefficient to deal with a large number of passports at a time. The conventional process of making the passports consequently disturbs the rationale of issuing the passports.

On the part of applicants, it has been necessary to prepare, in addition to a picture of the face of the applicant to be attached to the passport, an extra picture of the face of the applicant which is attached to an application form when making an application for a passport.

In recent years, with the growth of international passengers, in an attempt at relieving the confusion of passport control for the entry into, and departure from, a country, machine readable passports (MRPs). which are standardized across the world in order to make it possible to either optically or electrically, or visually, read personal data on machine readable passports by a particular machine, have been experimentally introduced at airports of some countries.

For preparing such machine readable passports, the process of making the machine readable passport requires, in addition to the above described steps, another step of providing machine readable personal data on the passport. Due to this additional step, it becomes even more troublesome to prepare the machine readable passports, hindering the rationale of issuing passports.

OBJECT OF THE INVENTION

It is, therefore, an object of the present invention to provide a personal booklet with a picture of the face and personal data of the book holder to provide the book holder's identity which is hard to forge or alter.

It is another object of the present invention to provide a personal booklet with a picture of the bookholder's face and machine readable personal data of the book holder to thereby provide the book holder's identity It is still another object of the present invention to provide a method of preparing a personal booklet with machine readable personal data of the book holder to provide the book holder's identity.

It is yet another object of the present invention to provide an apparatus for preparing a personal booklet with machine readable personal data of the book holder to provide the book holder's identity.

SUMMARY OF THE INVENTION

In accordance with the present invention, the personal booklet making method and apparatus comprises a cassette containing therein a thermal transfer photosensitive printing paper in the form of a roll; exposure means for exposing the thermal transfer photosensitive printing paper withdrawn from the cassette to a composite image of a picture of the face and personal data of the bookholder; a container containing therein booklets, each booklet having blank pages and a page formed with an image receiving layer superimposing means for superimposing the image receiving layer of each booklet picked up from the booklet container and the exposed thermal transfer photosensitive printing paper to force out air of the superimposed image receiving layer and exposed photosensitive paper and a thermal printing head for heating the superimposed image receiving layer and exposed photosensitive paper to develop and transfer the composite image from the thermal transfer photosensitive printing paper to the image receiving layer.

According to a feature of the present invention, a picture of the face of the bookholder or applicant attached to an application form and personal data of the applicant entered in the application form are optically printed on a thermal transfer photosensitive printing paper as a composite image. The thermal transfer photosensitive printing paper thus optically exposed is superimposed on the image receiving layer formed on the transparent cover sheet bound in the booklet so as to transfer the composite image into the image receiving layer by a thermal transfer process. Thereafter, the transparent cover sheet with the image receiving layer is adhered to a supporting sheet bound in the booklet as one page next to the transparent cover sheet. Upon superimposing the thermal transfer photosensitive sheet and the image receiving layer on the transparent cover sheet, they are pressed by a pair of pressure a plying rollers to force out air therebetween.

The present invention can avoid the necessities of directly attaching a picture of the face of the applicant to a booklet and directly typing personal data of the applicant on a page of the booklet, consequently booklets with pictures can be efficiently prepared automatically. In the case of making booklets as passports with pictures of the bookholders, no extra picture is necessary other than a picture attached to an application form. Furthermore, because it is quite easy to include optically readable characters in a composite image, the passport made by the present invention can be used as a machine readable passport.

BRIEF DESCRIPTION OF THE DRAWINGS

The description refers to the accompanying drawings in which like reference characters refer to like parts throughout the several views, and in which.

PREFERRED EMBODIMENTS OF THE INVENTION

Figure 1:
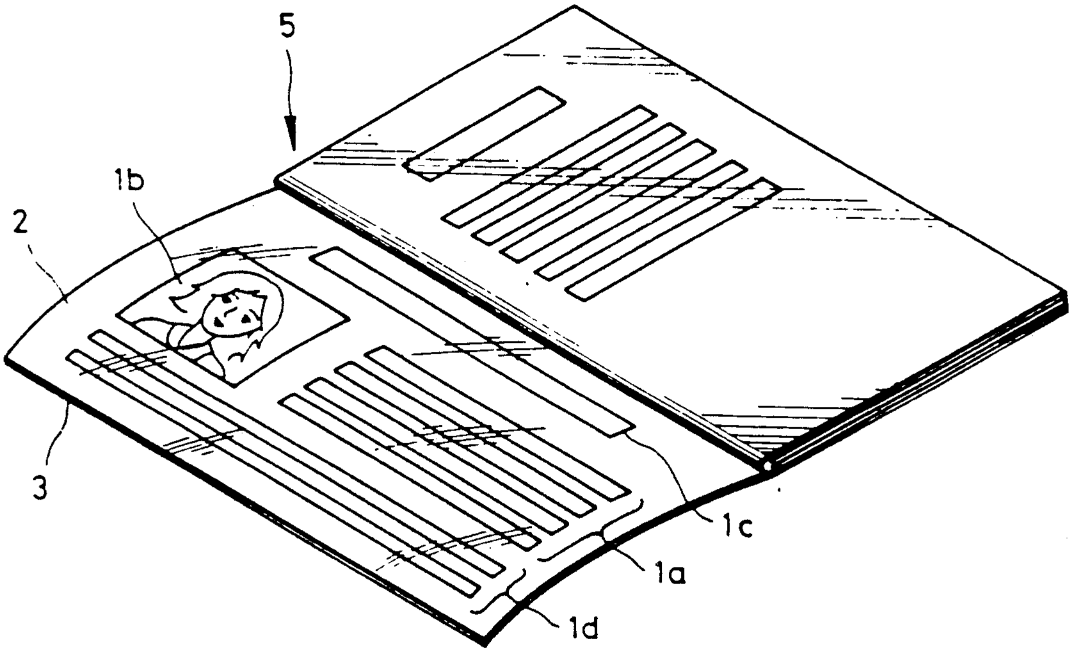
FIG. 1 is an illustration of a machine readable passport made by the present invention.
Figure 2:
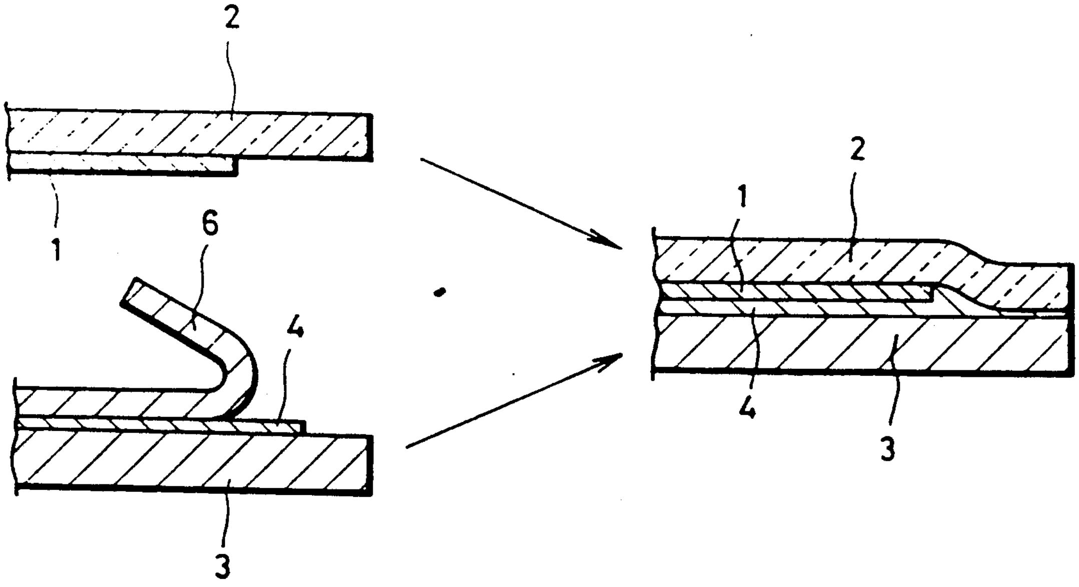
FIG. 2 is an explanatory illustration showing the construction of the machine readable passport of FIG. 1.

Referring now to the drawings in more detail and particularly to FIGS. 1 to 3, there is shown a machine readable passport (MRP) made by an apparatus according to a specific embodiment of the present invention. As shown, a machine readable passport 5 contains a plurality of pages bound as one booklet, one of the pages, for example a front cover page, comprises a transparent cover sheet 2 with an image receiving layer 1 of about 0.01 mm thickness coated onto the back surface thereof, a supporting sheet 3 adhered to the back of the transparent sheet 2. In the image receiving layer 1, a composite image of personal data 1*a* and a picture 1*b* of the face of the passport holder, a graphic design 1*c*, and special data 1*d* including optically readable characters is formed. The transparent cover sheet 2 with the image receiving layer 1 is heat-welded to the supporting sheet 3 by way of a heat-melt type adhesive layer 4 coated onto the front surface thereof to form one page of the machine readable passport 5.

Figures 3A, 3B, 3C:
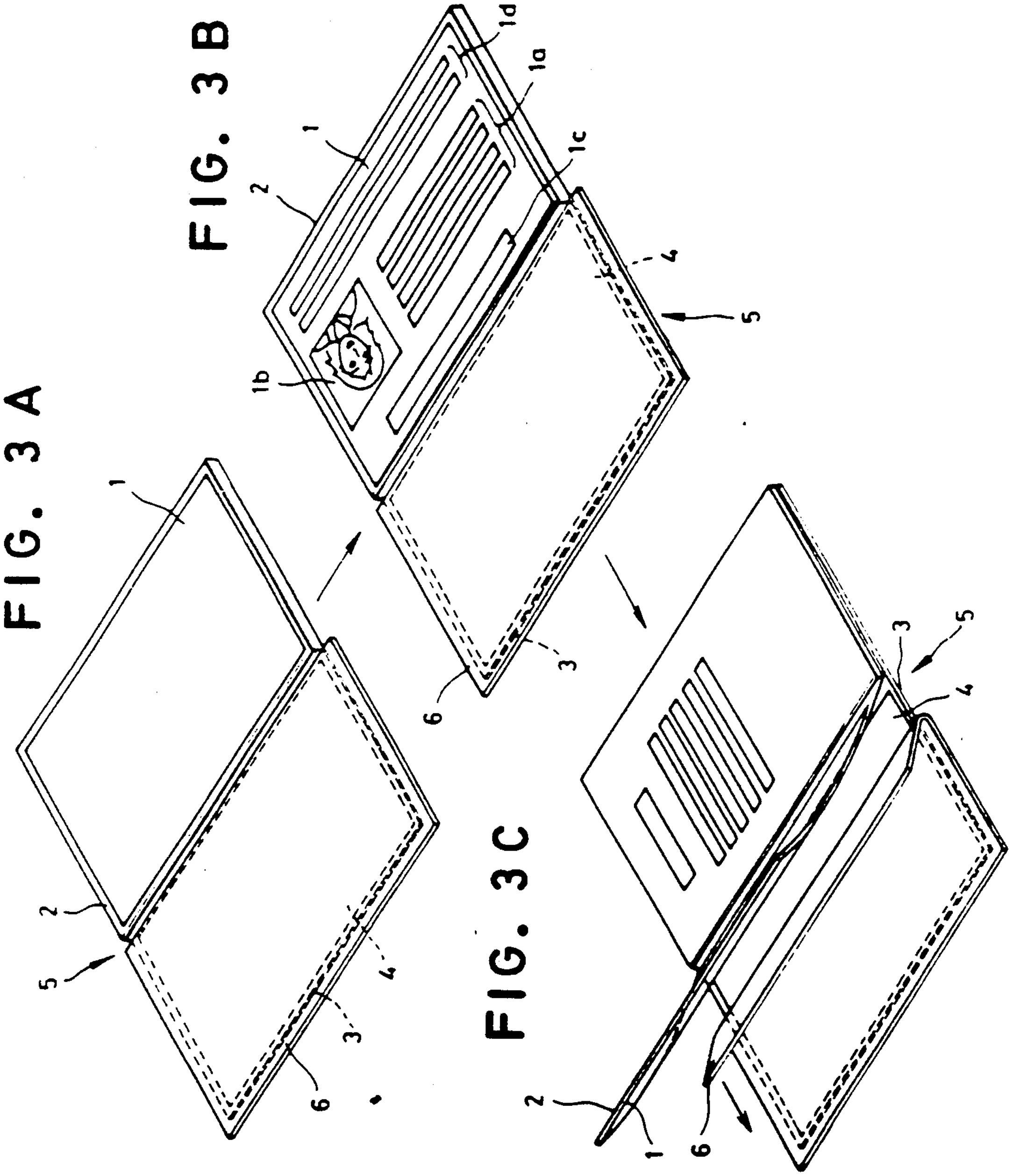
FIGS. 3A to 3C are perspective, exploded illustrations showing a sequence of making the machine readable passport of FIG. 1.

The supporting sheet 3, which is used as a front cover of the machine readable passport 5 as is shown in FIG. 3A, is made of, for example, paper sheets of a thickness between 0.1 and 0.8 mm, plastic sheets, combined sheets of plastic sheets and papers stuck together, or paper sheets with one or both sides laminated with plastic sheets. The plastic sheet is made, not exclusively, but preferably, of polyethylene terephtalete, polycarbonate, acetylcellulose, cellulose ester, polybinilacetate polystilen, polypropylene, polyvinyl chloride, nylon, polyethylene or the like. It is also preferable to mix white pigments such as $TIO_2$, ZnO etc.. or to contain color pigments or dyes, in the plastics.

The transparent cover sheet 2, which is used as the inside page of the front cover as is shown in FIG. 3A. is made of transparent plastic sheets of about 0.05 to 0.35 mm thickness and is sized equivalent to or slightly smaller than the supporting sheet 3. Any one of the above mentioned plastic materials available as the supporting sheet 3 may be used for the transparent cover sheet 2. As is shown in FIG. 3B, into the image receiving layer 1, a picture 1*b* of the face and personal data 1*a* of the passport holder, a graphic design 1*c* if necessary, and optically readable special data 1*d* are transferred in a thermal transfer printing process. As will be described later, these picture, design and data 1*a* and 1*d* are laid out and are composed as a single composite image on a CRT screen by a computer. Then, a thermal transfer type photosensitive printing paper 40 is exposed to the CRT composed image displayed on the CRT screen to form a latent composite image therein in a three color frame sequence exposure and is, thereafter, thermally developed. The developed composite image is finally transferred onto the image receiving layer 1.

Figure 7:
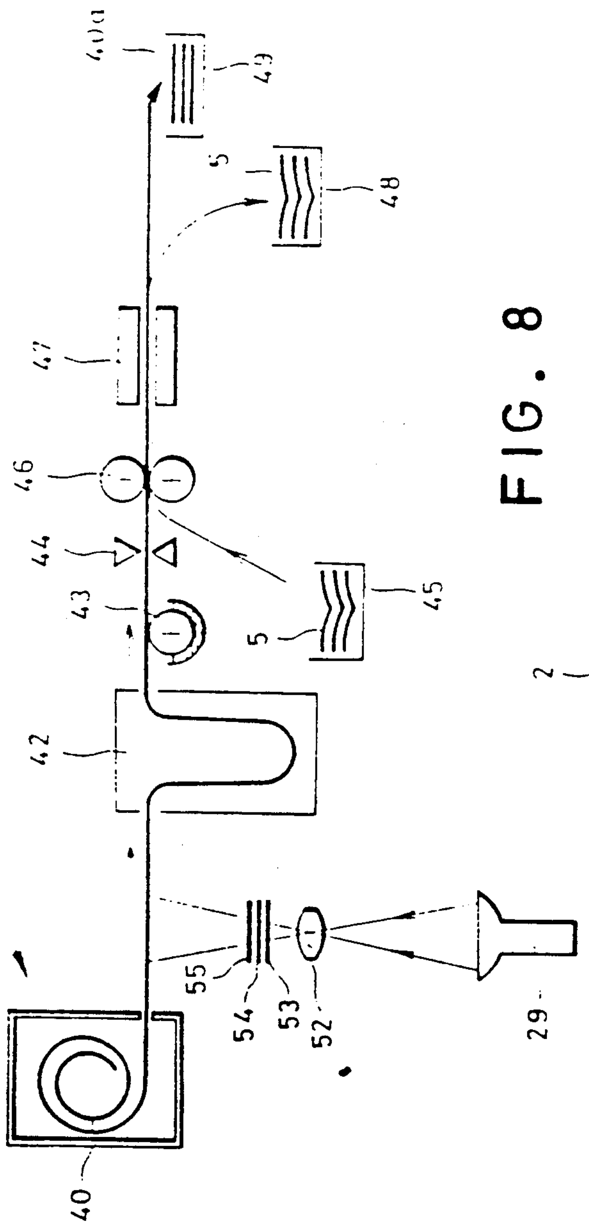
FIG. 7 is a schematic illustration showing a video printer in the system of FIG. 5.

The image receiving layer 1 comprises substances including a dye fixer such as dye mordant agents which can be chemically reactive on dye released from a thermally developable photosensitive layer of the thermal printing paper 40 (see FIG. 7). Any type of dye fixer may be selected according to the properties of dye released from the thermally developable photosensitive layer, chemical compositions of the thermally developable photosensitive layer, thermally transferring conditions and so forth. It is preferable to use, for example, polymer mordant agents of a high molecular weight. The photosensitive thermal printing paper used in this embodiment may take any type of thermal transfer printing color paper, for example, the type of releasing dye which is exposed to light and transferred to the dye fixer containing a mordant agent by the aid of a solvent such as water, the type of transferring released dye to the dye fixer with an organic solvent having a high boiling point, the type of transferring released dye to the dye fixer with a hydrophilic solvent contained in the dye fixer, the type of diffusing or sublimating released dye to transfer it to the dye fixer, etc. These types of photosensitive thermal transfer printing papers are well known and are disclosed in, for example, U.S. Pat. No. 4,500,626. Japanese Unexamined Patent Publications Nos. 60-133,449, 59-218,443, 61-238,O56, and European Patent No. 22O,746A2 and so forth.

The adhesive layer of, for example, 0.001 to 0.2 mm thickness is provided over the back surface of the supporting sheet 3 to which the image receiving layer 1 of the transparent sheet 2 is attached. It is preferred to use adhesive materials for the adhesive layer which do not photographically or chemically attack the transferred composite image on the image receiving layer 1 but cause the transparent and supporting sheets to quickly stick to each other without generating air bubbles therebetween. It may be permissible to apply the adhesive layer 4 to the image receiving layer 1 after transforming the composite image thereto in place of applying it to the supporting sheet 3. Otherwise, an adhesive sheet or an adhesive sheet with a peelable sheet to which adhesive material is applied may be used.

Figure 8:
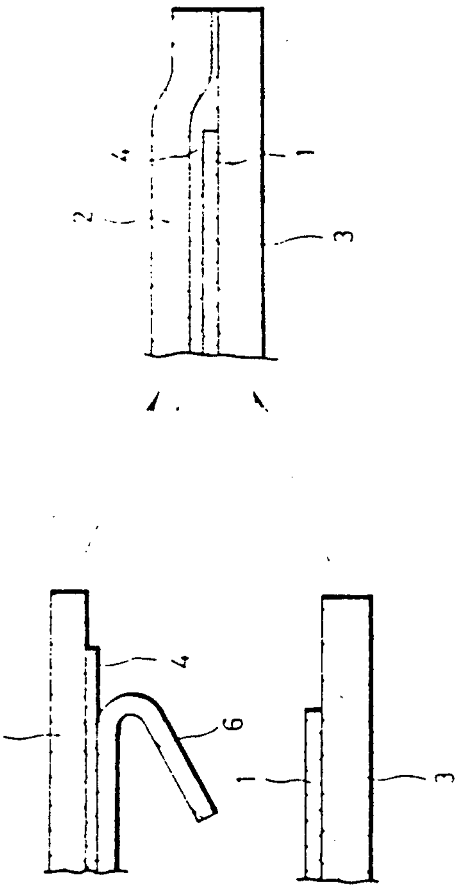
FIG. 8 is an explanatory illustration similar to FIG. 2 but showing another construction of the machine readable passport of FIG. 1.
Figure 9:
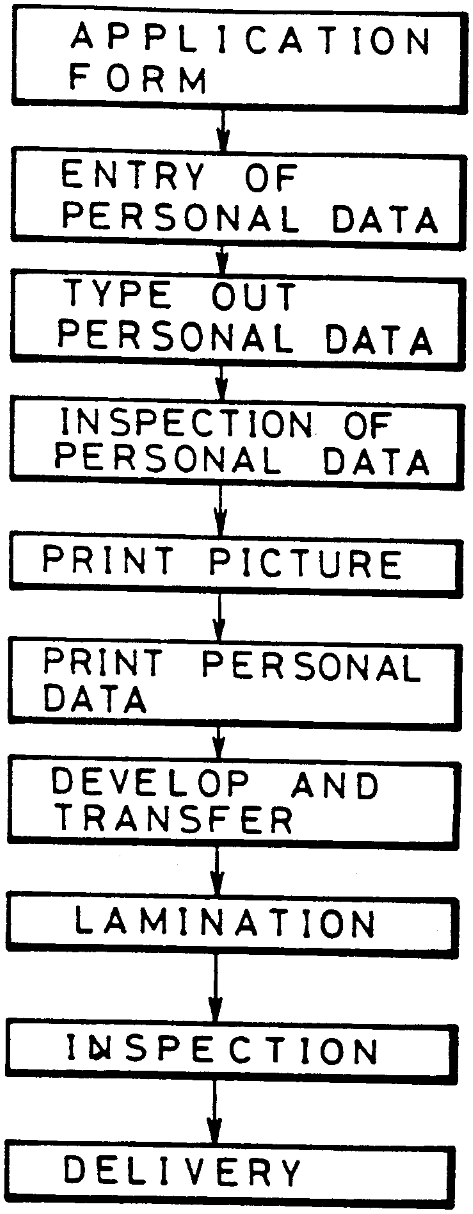
FIG. 9 is a flow chart illustrating the process of making the machine readable passport of FIG. 1 according to another preferred embodiment of the present invention.

Over the adhesive layer 4 there is applied a peelable sheet 6 which is sized slightly larger than the supporting sheet 3 so that the periphery of the peelable sheet 6 is easily picked up between fingers and is peeled apart. For easily handling the passport booklet 5 during the preparation thereof, the peelable sheet 6 may be sized to be equal to or smaller than the supporting sheet 3 so far as it is larger than the image receiving layer 1. It is to be noted that, as is shown in FIG. 8, the image receiving layer 1 may be formed on the supporting sheet 3 and the adhesive layer 4 may correspondingly be formed over the transparent cover sheet 2.

Figure 4:
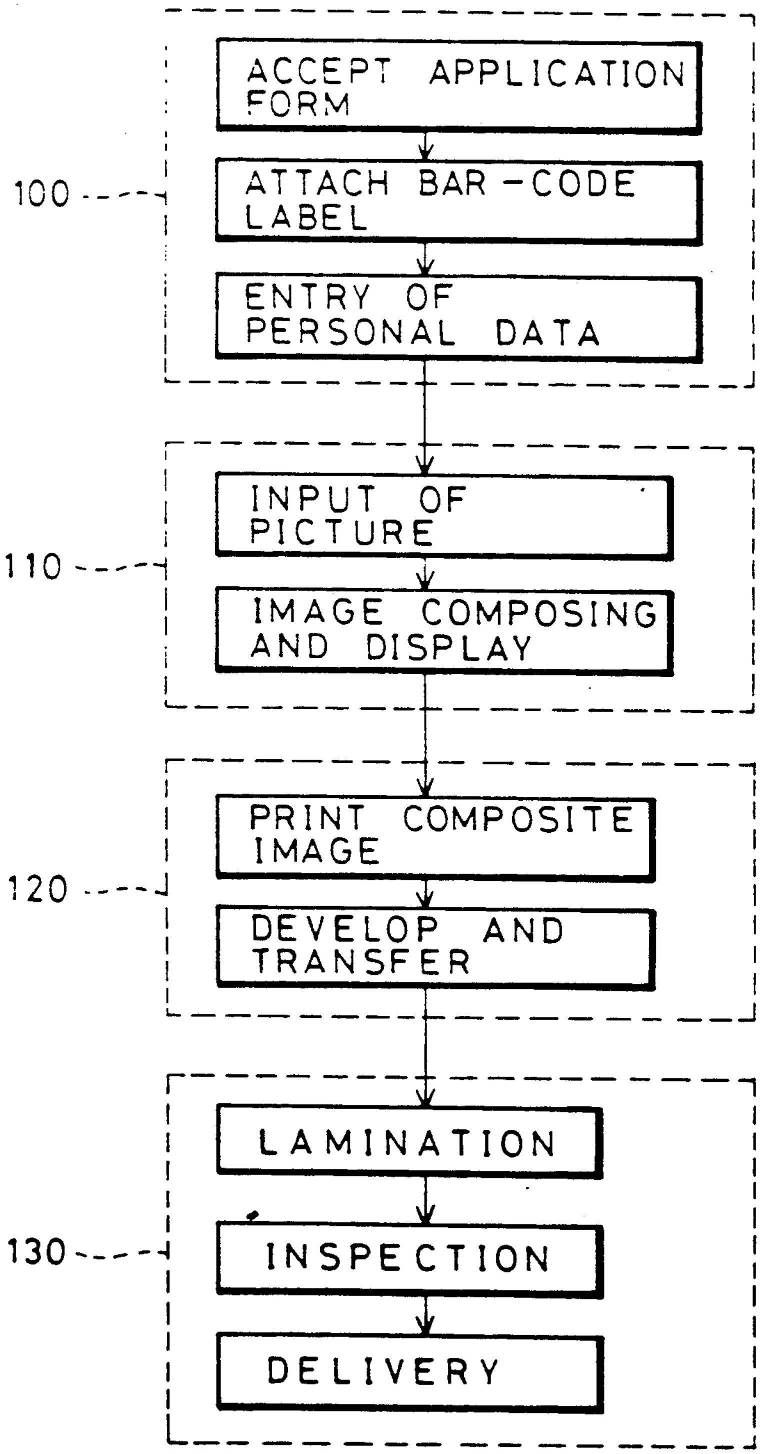
FIG. 4 is a flow chart illustrating the process of making the machine realable passport of FIG. 1 according to a preferred embodiment of the present invention.
Figure 5:
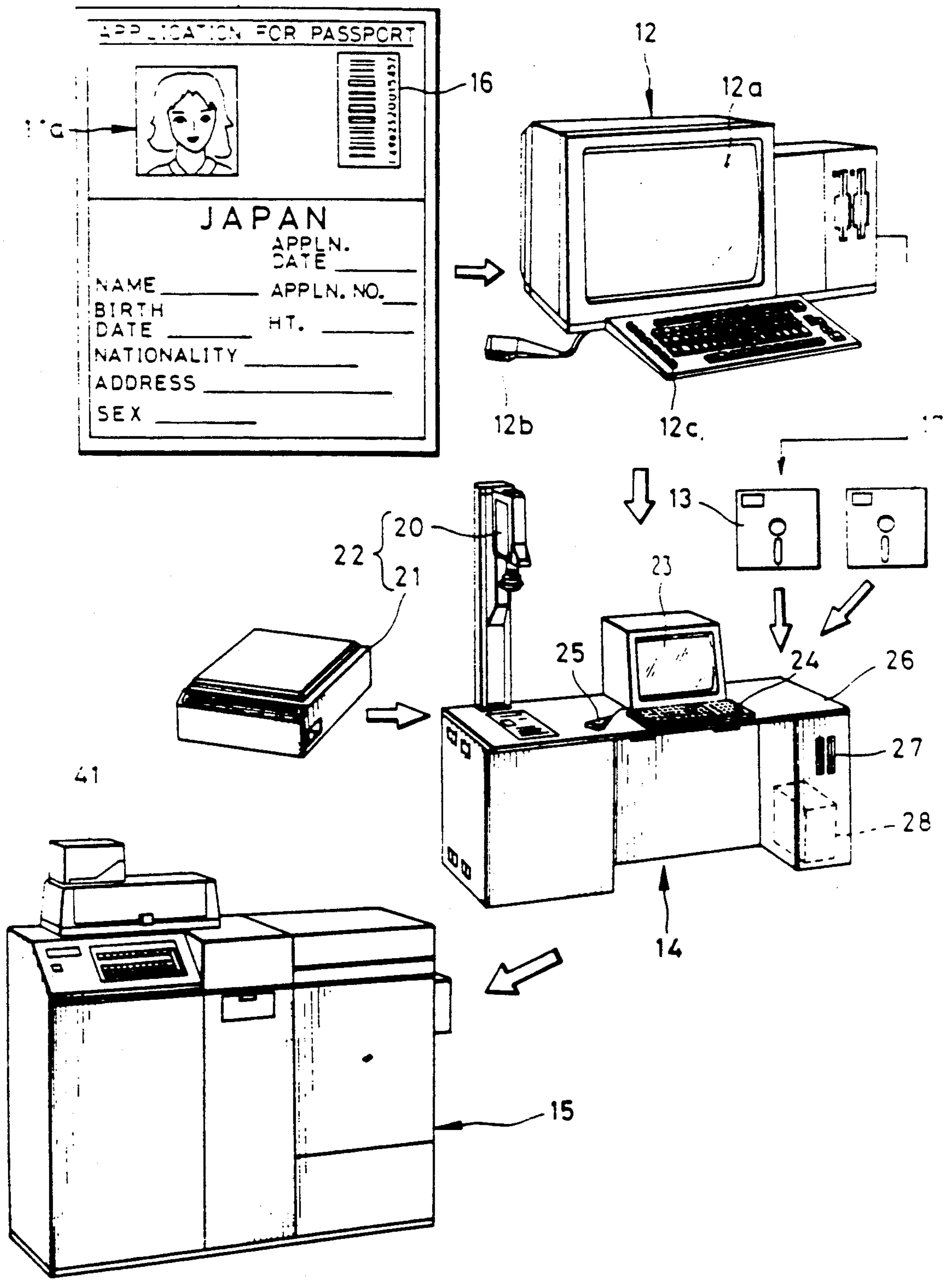
FIG. 5 is an illustration of a system of making a machine readable passport.

The process of making machine readable passports will be had from the following description referring to FIGS. 4 through 7. As is shown in FIGS. 4 and 5, the machine readable passport is prepared through a process of four steps namely a data entry step 100, an image composite step 110, a video image printing step 120 and a finishing step 130.

In the data entry step 100 after attaching a bar-code label 16 carrying a personal identification number to an application form 11, an operator prepares the necessary personal data for describing or identifying the applicant of a machine readable passport such as the name, the date of birth, nationality, sex and so forth, by entering them with a word processor 12 having a CRT display 12*a*, a bar-code reader 12*b* and a keyboard 12*c* based on data filled in or entered on the application form 11 and storing them in a floppy disk 13. The personal data is stored in the form of coded data along with the personal identifying number read out from the bar-code label 16.

Figure 6:
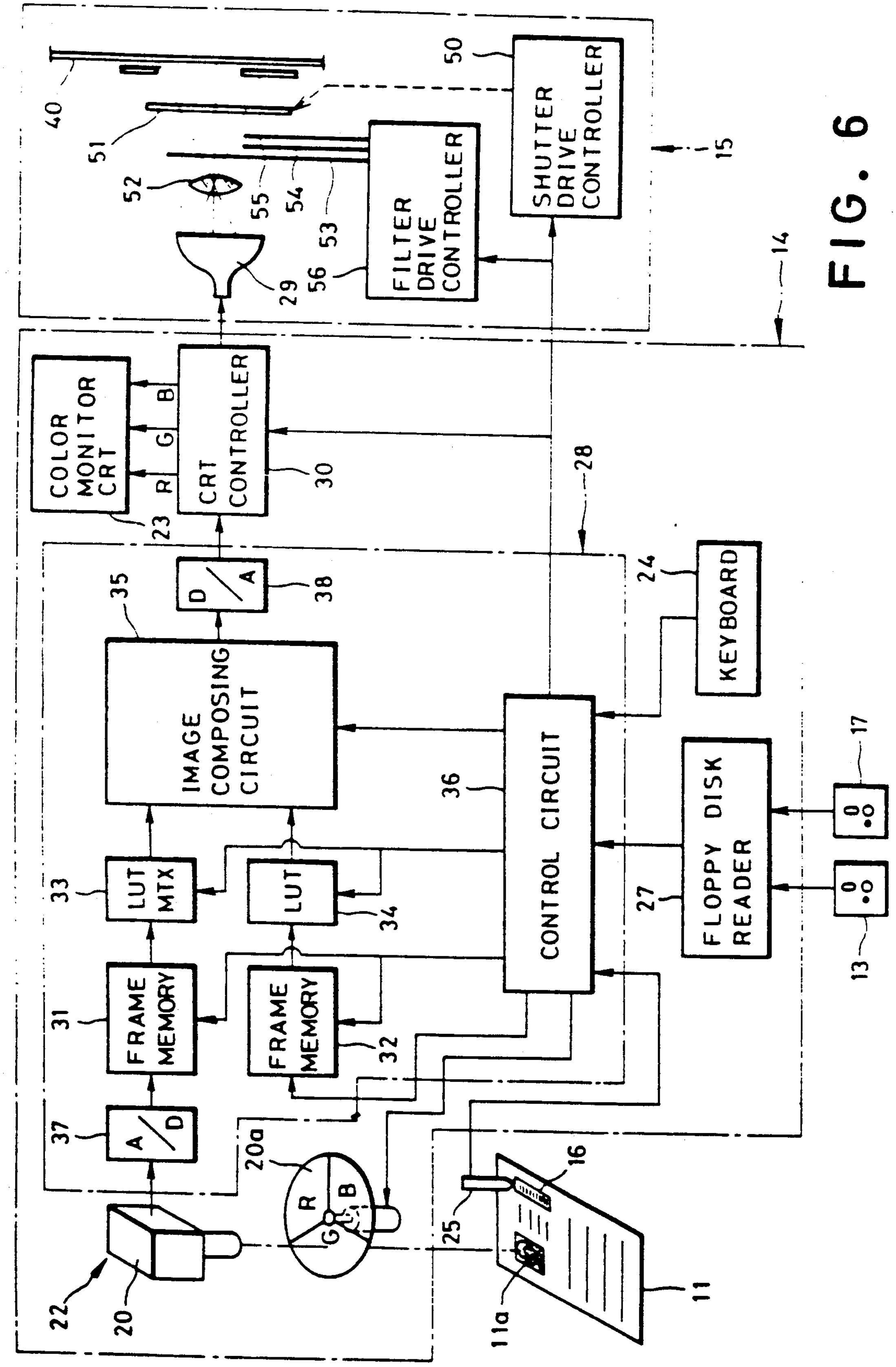
FIG. 6 is a block diagram showing a video printer and an image composing apparatus in the system of FIG. 5.

In the image composite step 110 an image of the picture 11*a* of the face of the applicant attached to the application form 11 and the applicant's personal data are single composite as a composed image by an image composer 14. For editing a composite image on a color monitor comprising a color CRT display 23 the operator displays the picture 1*b* of the face of the applicant, the applicant s personal data 1*a* retrieved from the floppy disk 13 and input through a character generator, the graphic design 1*c* and the optically readable special data 1*d* which are constructed based on the personal data. The image composer 14, as is shown in FIGS. 5 and 6 comprises a picture image input device 22 such as a TV camera 20 or a color image scanner 21, a color monitor CRT display 23, a console 26 having a keyboard 24 and a bar-code reader 25, a data reader 27 for reading the personal data stored in the floppy disk 13 and data of the graphic design stored in the floppy disk 17, an image composing unit 28 comprising a microcomputer for preparing a composite image from the data read from the floppy disks 13 and 17, and a CRT controller 30 for controlling the color monitor CRT 23 and a black-and-white CRT of the video printer 15. It is preferred to employ a black-and-white TV camera for the TV camera because it has a high resolving power. In the case of employing a black-and-white TV camera, it is necessary to provide color separating means 20*a* comprising three primary color filters, namely red, green and blue filters each being insertable into the optical axis of the black-and-white TV camera independently of the other two.

The image processing unit 28 as is shown in detail in FIG. 6 reads out the image data of the picture 1*b* of the face of the applicant input through the picture image input device 22 and of the personal data of the applicant according to the personal identification number of the applicant. The image data, the personal data of the applicant and the graphic design data are stored in frame memories 31 and 32 under the control of a controller 30 and, thereafter, are transferred to a look-up table (LUT) matrix circuit 33 and a look-up table (LUT) memory 34, respectively, for correcting gradation. Then those data are composed in the image composing circuit 35. Control circuit 36 is comprised of, for example, a microcomputer, and controls sequentially each circuit or peripheral device of the image processing unit 28 so as to input images and characters, and then compose those image and characters. Control circuit 36 also controls video printing by image composer 14 and video printer 15. Designated by numerals 37 and 38 are A/D and D/A converters, respectively for converting video signals by color.

In the video image printing step 120, the composite image prepared in the image composing step 110 is printed on the thermal transfer type photosensitive printing paper 40 and, after development, is transferred into the image receiving layer 1 by a video printer 15 in a thermal transfer printing process. The video printer 15, as is shown in FIGS. 6 and 7 comprises a paper cassette 41 containing a roll of thermal transfer type photosensitive printing paper 40, the CRT 29 for displaying a composite image to which the printing paper 40 is exposed, an antechamber 42 for retaining the exposed printing paper 40 in the form of a loop, a water applicator 43 disposed after or downstream of the antechamber 42 for applying water as an activator for promoting the thermal transfer process in a uniform layer to the exposed surface of the printing paper 40 a cutter 44 disposed after or downstream of the water applicator 43 for cutting off the exposed printing paper 40 to individual print strips, a booklet container 45 in which a number of booklets 5 are stored in a stack with their image receiving layers up, a pair of pressure applying rollers 46 for superimposing and applying pressure between the print strip of the exposed thermal printing paper 40 and the image receiving layer 1 of a booklet 5 picked up from the booklet container 45 so as to force out air therebetween, a thermal image printing head 47 for applying heat to the print strip of the printing paper 40 and the image receiving layer 1 of the booklet 5 superimposed a container 48 into which the booklet 5 with a composite image transferred thereto is stacked, and a wastepaper container 49 into which the used print strip of the printing paper 40 is discarded.

The printing CRT sequentially displays a composite image as a black-and-white image in the form of a brightness pattern by color which is projected onto the printing paper 40 by means of a printing lens 52 during the opening of a shutter 51 controlled by a shutter controller 50. For translating each black-and-white image into a corresponding monochromatic image, there are provided three color filters, namely blue, green and red filters 53, 54, and 55 which are inserted into a printing path defined by the printing lens 52 independently of each other so as to perform a three color frame sequence exposure. These filters are controlled by a filter drive controller 56. As shown by the arrows in FIG. 6, filter drive controller 56 is actuated by a signal from control circuit 36 during video printing, and selectively drives the blue, green, and red filters 53, 54, and 55, respectively, to insert one or more of them into the printing path. The printing CRT 29 may be replaced with well known image display devices such as LED image display devices, LC image display devices, laser image display devices or the like.

The printing paper 40, after having been exposed, is intermittently transported into the antechamber 42.

After passing the antechamber 42, the water applicator 43 applies water to the exposed surface of the printing paper 40. If the image receiving layer 1 contains a heat soluble activator for promoting thermal image transfer such as ureas, crystallized water, micro-capsules or the like, the application of water by the water applicator 43 may be omitted.

After the application of water, the exposed printing paper 40 is cut into print strips by the cutter 44. Each print strip is laid on top of the image receiving layer 1 of a booklet 5 picked up from the booklet container 45. The pressure applying rollers 46 superimpose the print strip and the image receiving layer 1 of the booklet 5 and applies pressure therebetween to distribute water applied by the water applicator 43 in a uniform layer over the exposed surface of the print strip of the printing paper 40 and/or the image receiving layer 1. The superimposed printing strip and image receiving layer 1 of the booklet 5 is placed between, and heated by, upper and lower heating plates of the thermal image printing head 47 so as to develop and transfer the thermal image to the image receiving layer 1 from the print strip of the printing paper 40. Because of a relatively long time necessary for the thermal printing step, it is preferred to provide a plurality of thermal printing heads 47 for simultaneously processing a plurality of booklets 5. Thereafter, the booklet 5 thus processed is put into the container 48 while the print strip 40*a* of the printing paper 40 is discarded in the wastepaper container 49.

In the finishing step 130, as is shown in FIGS. 3 and 4, the transparent cover sheet 2 bearing the image receiving layer 1 with a composite image thermally transferred thereon is superimposed over and adhered to the supporting sheet 3 through the adhesive layer 4 as one page. Finally, after inspecting the identity between the personal data and the picture of the face of the applicant and so forth, the booklet 5, as a machine readable passport is delivered to the applicant.

Since the composite image thermally printed on the passport includes personal data comprising optically readable characters which provides the identity of the passport holder, the passport can be used as a machine readable passport which is checked by an optical character reading machine.

Referring now to FIGS. 1 to 11, there is shown an apparatus for making a machine readable passport according to another preferred embodiment of the present invention. As shown, after having accepted an application form 11 (FIG. 10) with a picture of the face 11*a* and personal data of the applicant, necessary personal data are edited and printed out on a data sheet 65 with characters, or common data, and a pattern previously printed thereon (see FIG. 10) by the aid of a word processor based on the personal data entered in the application form 11. After the inspection of the personal data printed on the data sheet 65, the photosensitive thermal printing paper 40 is directly exposed, first to the picture 11*a* of the face of the applicant attached to the application form 11 and then, to the data sheet 65. The exposed photosensitive paper is thermally developed and a composed image on the photosensitive paper is transferred onto the image receiving layer formed on the supporting sheet or the transparent cover sheet bound in the booklet. Finally, the supporting sheet and the transparent cover sheet are adhered to each other to sandwich the image receiving layer with the composed image therebetween. After inspecting the composite image in particular the coincidence between the picture and the personal data, the booklet is delivered as a machine readable passport to the applicant.

Figure 10:
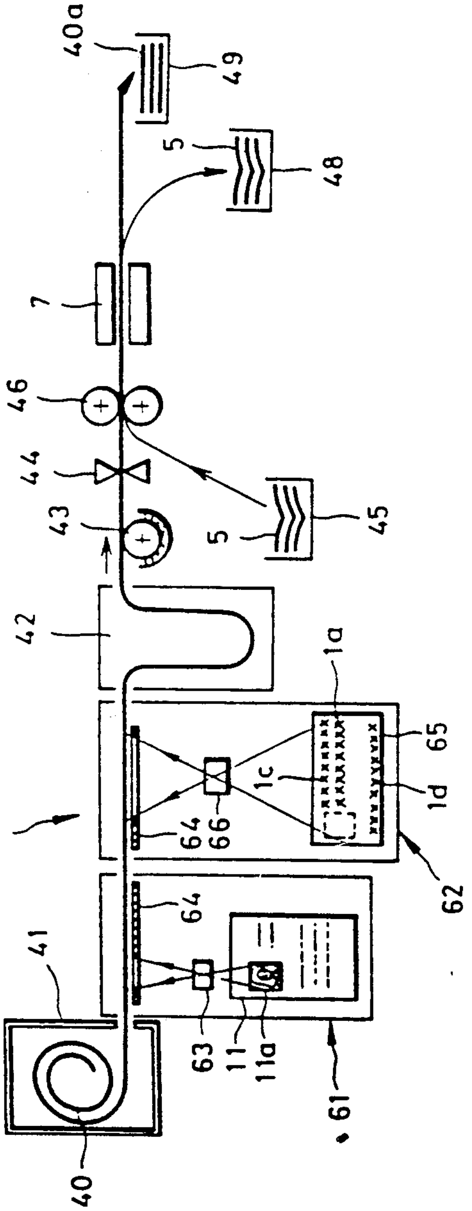
FIG. 10 is a schematic side view of a printing apparatus for optically printing a composite image.

The printing apparatus for making the machine readable passport is shown in FIG. 10 wherein same reference characters denote same or similar elements or parts as in the video printer 15 shown in FIG. 7. The printing apparatus 60 comprises the paper cassette 41 containing a roll of photosensitive thermal printing paper 40, first exposure means including a printing lens 63 for exposing the photosensitive thermal printing paper 40 to the picture 11*a* of the face of the applicant attached to the application form 11, second exposure means including a printing lens 66 for exposing the data sheet 65 placed adjacent to the application form 11 onto the same frame of the photosensitive thermal printing paper 40, the antechamber 42 disposed after the second exposure means for retaining the exposed thermal printing paper 40 in the form of a loop, the water applicator 43 disposed after the antechamber 42 for applying water in a uniform layer to the exposed surface of the thermal printing paper 40 as an activator for promoting the thermal transfer process a cutter 44 disposed after the water applicator 43 for cutting the exposed thermal printing paper 40 into individual print strips a booklet container 45 in which a number of booklets 5 are stored in a stack with their image receiving layers up, a pair of pressure rollers 46 for superimposing and applying pressure between the print strip of the exposed thermal printing paper 40 and the image receiving layer 1 of a booklet 5 picked up from the booklet container 45 so as to force out air therebetween, a thermal image printing head 47 for applying heat the print strip of the thermal printing paper 40 and the image receiving layer 1 of the booklet 5 superimposed a container 48 into which the booklet 5 with an image transferred is stacked, and a wastepaper container 49 into which the used print strip 40*a* of the thermal printing paper 40 is discarded.

The first exposure means 61 includes an illumination lamp (not shown) for illuminating the picture 11*a* contained on the upper left portion of the application form 11, a first printing lens 63 for projecting an image of the picture 11*a* on the application form 11 onto a frame of the thermal printing paper 40, and a first exposure framing mask 64 disposed close to the thermal printing paper 40 to expose only the picture 11*a* on the application form 11 to the thermal printing paper 40.

The second exposure means 62 includes an illumination lamp (not shown) for illuminating the data sheet 65 adjacent to the application form 11 from the upper right of the data sheet 65 on which the personal data 1*a*, a graphic image 1*c* and optically readable characters 1*d* for providing the applicant's identification are printed, a second printing lens 66 for projecting an image of the data sheet 65 onto the same frame of the thermal printing paper 40 onto which the picture 11*a* is exposed, and a second exposure framing mask 67 (see FIGS. 11B and 11D) disposed adjacent to the first exposure framing mask 64 and close to the thermal printing paper 40 to expose an image of the data sheet 65 to the thermal printing paper 40.

Figure 11A:
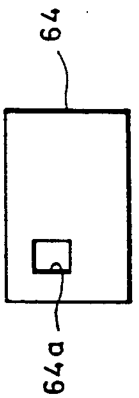
FIGS. 11A to 11D are explanatory illustrations showing exposure framing masks which are used in the printing apparatus of FIG. 10.
Figure 11B:
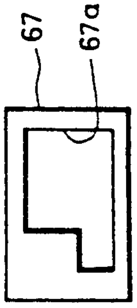
Figure 11C:
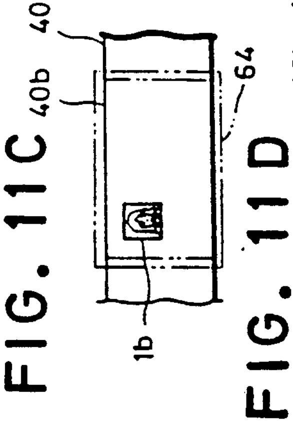
Figure 11D:
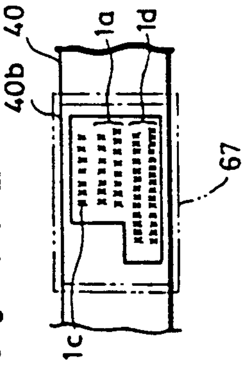

As is shown in FIGS. 11A and 11B, the first and second exposure framing masks 64 and 67 are formed with different openings 64*a* and 67*a*, respectively, for defining exposure areas. Due to the provision of the different framing masks 64 and 67, there are printed images of the picture 11*a* and the data sheet 65 at different positions on paper 40 but on the same frame of the thermal printing paper 40.

Figure 12:
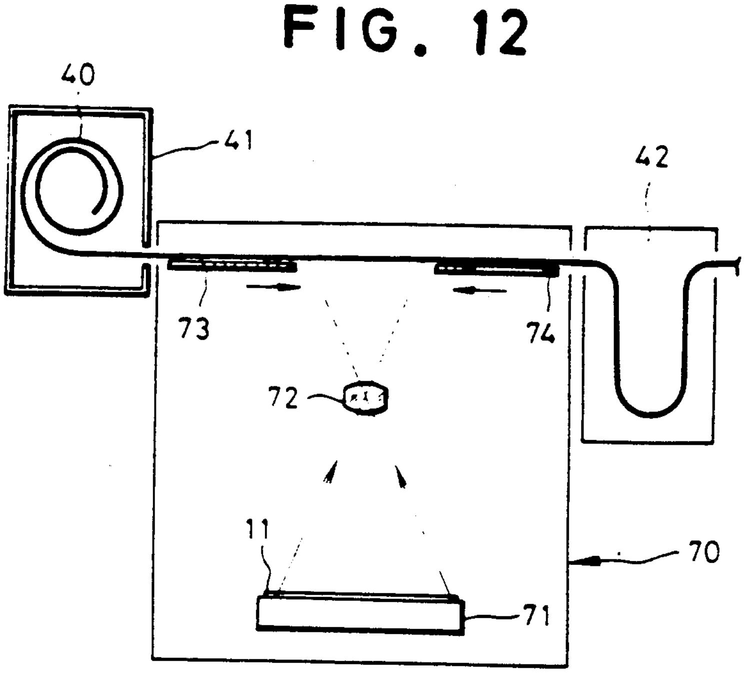
FIG. 12 is a schematic side view of a composite image printing unit of the printing apparatus according to still another embodiment of the present invention.

In place of the first and second exposure mean 61 and 62, a composite image printing unit 70 may be incorporated. As is shown in FIG. 12, the composite image printing unit 70 comprises a stationary table 71 on which the application form 11 or the data sheet 65 is placed, a printing lens 72 for projecting an image of the picture 11*a* attached to the application form 11 or the data sheet 65 onto the thermal printing paper 40, first and second framing masks 73 and 74 which are interchangeably placed above the printing lens 72 to define exposure areas similar to those shown in FIGS. 11A and 11B. When the picture 11*a* of the application form 11 is printed, the first framing mask 73 is moved and placed above the printing lens 72. After the of the picture 11*a*, the application form 11 is replaced with the data sheet 65. Thereafter, the first framing mask 73 is removed and the second framing mask 74 is moved and placed above the printing lens 72 for printing the data sheet 65.

Figure 13:
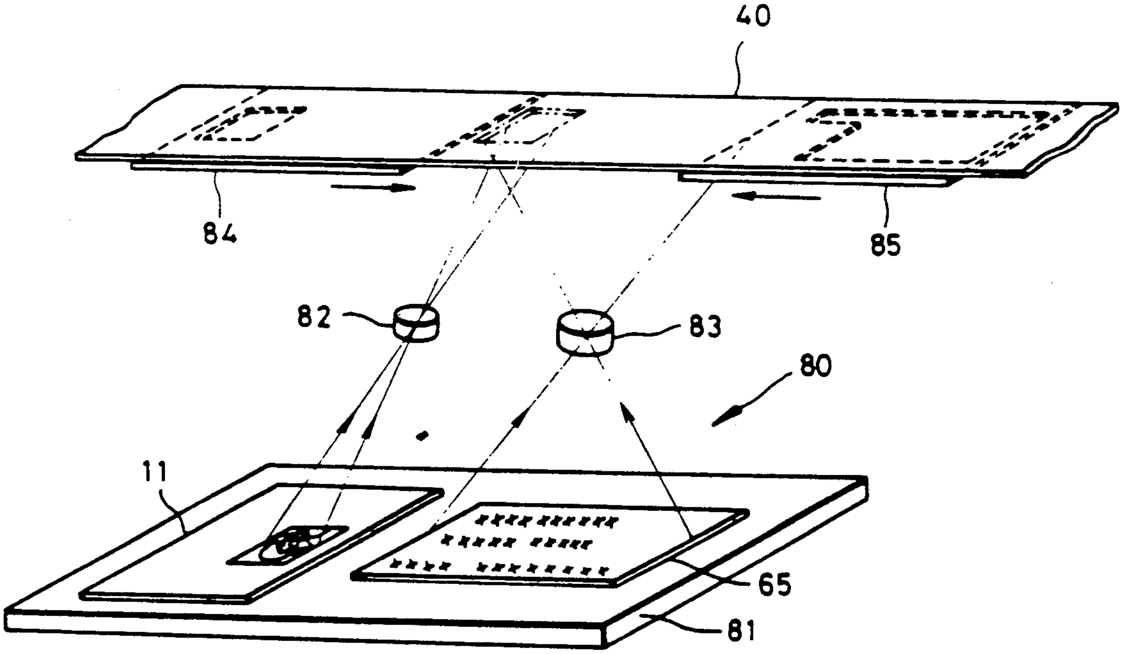
FIG. 13 is a schematic, perspective side view of a composite image printing unit of the printing apparatus according to still another embodiment of the present invention.

FIG. 13 illustrates an another embodiment of the composite image printing unit 70. A composite image printing unit 80 of this alteration is provided with a pair of printing lenses 82 and 83 for projecting images of the application form 11 and the data sheet 65 placed on the table 61 side by side. First and second framing masks 84 and 85 which are the same as those of the composite image printing unit 70 of FIG. 12 are interchangeably placed above the table 81 to sequentially expose the images of the picture 11*a* of the application form 11 and the data sheet 65 onto the same frame of the thermal printing paper 40. In this embodiment, because the necessity of replacing the application form with the data sheet is not required, the operation of changing between application form 11 and data sheet 65 is simplified in comparison with using the composite image printing unit 70.

Figure 14:
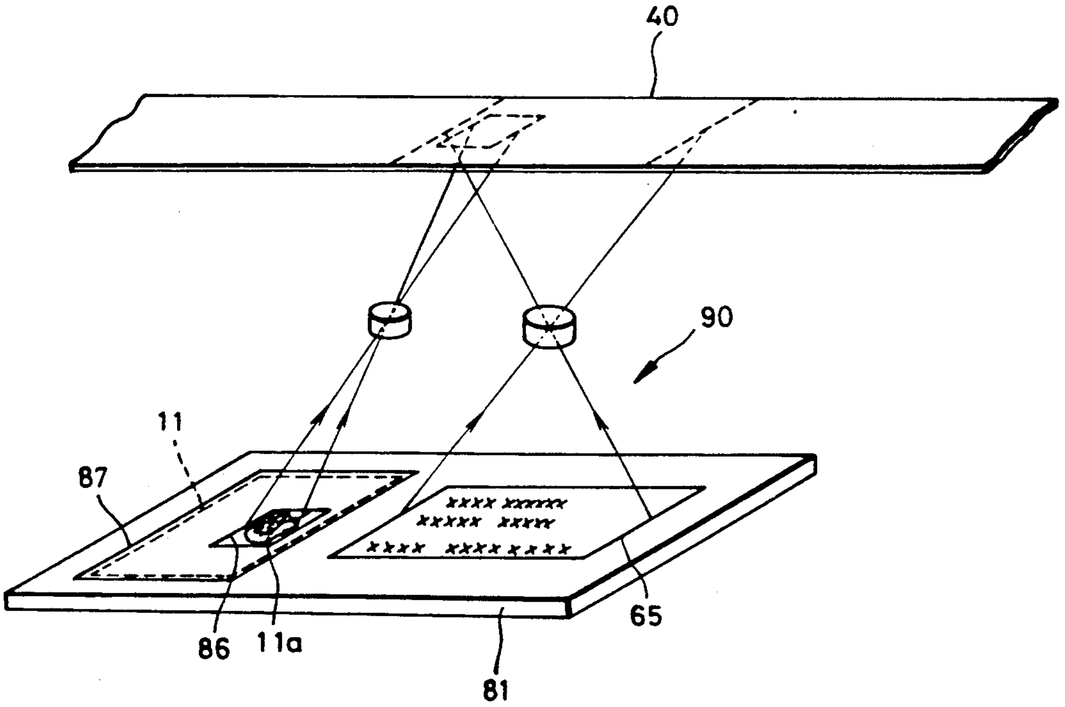
FIG. 14 is a schematic, perspective side view of a composite image printing unit of the printing apparatus according to yet another embodiment of the present invention.

FIG. 14 shows another embodiment of the composite image printing unit 70 in which no interchangeable framing masks are used. In a composite image printing unit 90 of FIG. 14, the application form 11 and the data sheet 65 are placed on the table 81 side by side and are simultaneously projected onto a frame of the thermal printing paper 40 by means of a pair of printing lenses However, the application form 11 is covered with a light blocking mask 87 made of, for example, a blackened sheet, formed with an opening 86 for only exposing the picture 11*a* of the application form 11.

The above description of the invention is intended to be illustrative and not limiting. Various changes or modifications in the embodiments described may occur to those skilled in the art and these can be made without departing from the scope of the invention.

What is claimed is:

1. A method of making a personal booklet having a picture and personal data of the booklet holder for providing the booklet holder's identity the method comprising the steps of:

entering a picture of the booklet holder as a figure image into an image composing device;

entering personal data of said booklet holder as a character image into said image composing device;

providing a composite image of said entered figure and character images by said image composing device;

forming said composite image onto an image receiving material layer formed on one of a transparent cover sheet and a supporting sheet bound in said booklet, said figure and character image being formed separately but adjacent to each other on said image receiving material layer; and sandwiching said image receiving material layer between said supporting sheet and said transparent cover sheet.

2. The method as defined in claim 1 wherein the step of entering the picture of the booklet holder comprises the step of entering a picture of the booklet holder which was previously attached to an application form.

3. A method as defined in claim 1, wherein said image receiving material layer is formed over said supporting sheet bound in said booklet and is adhered to said transparent cover sheet bound in said booklet through an adhesive sheet.

4. The method as defined in claim 1, wherein said personal data is provided on an application form and is entered by a word processor.

5. The method as defined in claim 1, wherein said picture of the bookholder is a picture of the face of said bookholder, and said picture is entered through a TV camera.

6. The method as defined in claim 1, wherein said picture of the bookholder is entered through a color image scanner.

7. The method as defined in claim 1, wherein said image receiving material layer is formed over said transparent cover sheet bound in said booklet and is adhered to said supporting sheet bound in said booklet through an adhesive layer applied to said supporting sheet.

8. The method as defined in claim 1, wherein said image receiving material layer is formed over said supporting sheet bound in said booklet and is adhered to said transparent cover sheet bound in said booklet through a transparent adhesive layer applied to said transparent sheet.

* * * * *